June 17, 1947.    H. L. PEEK    2,422,562
CIRCUIT BREAKER
Filed May 15, 1942    3 Sheets-Sheet 2
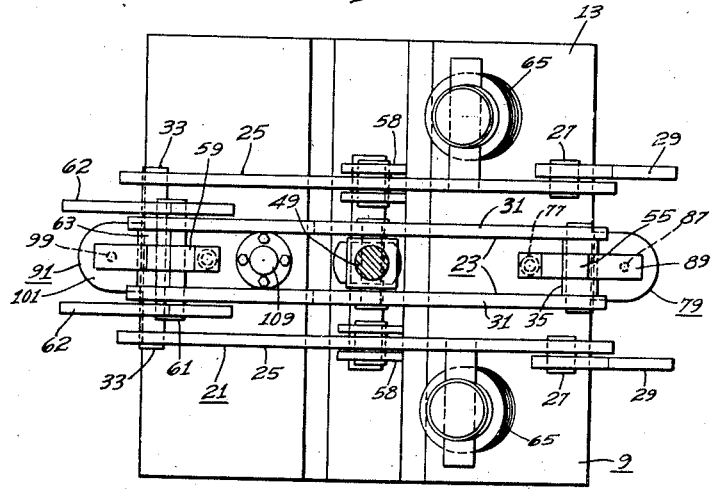
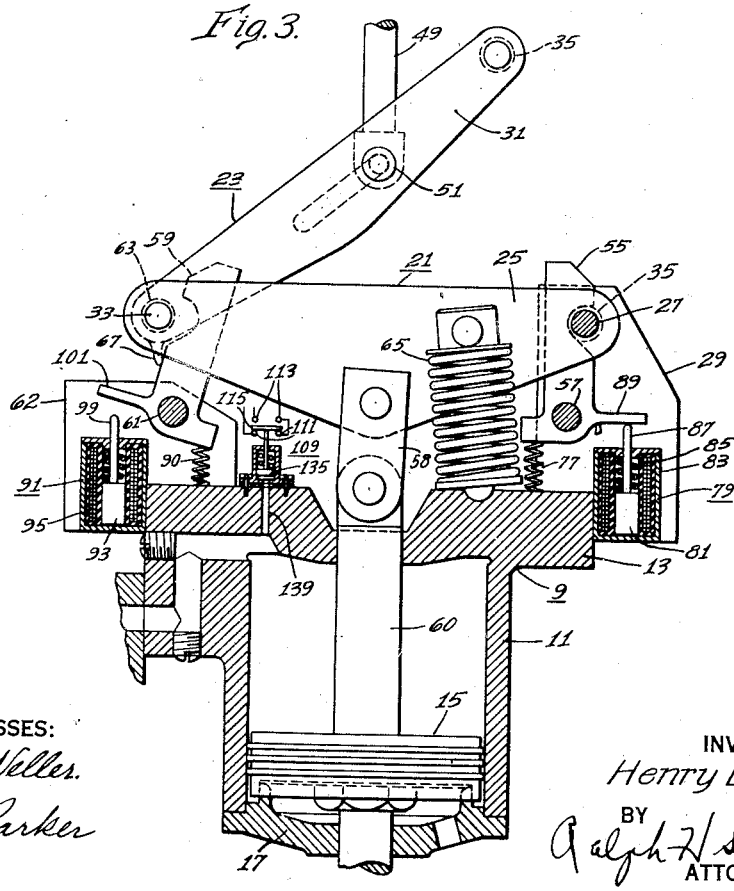
WITNESSES:
C. J. Weller.
G. S. Parker
INVENTOR
Henry L. Peek.
BY
Ralph H. Swingle
ATTORNEY

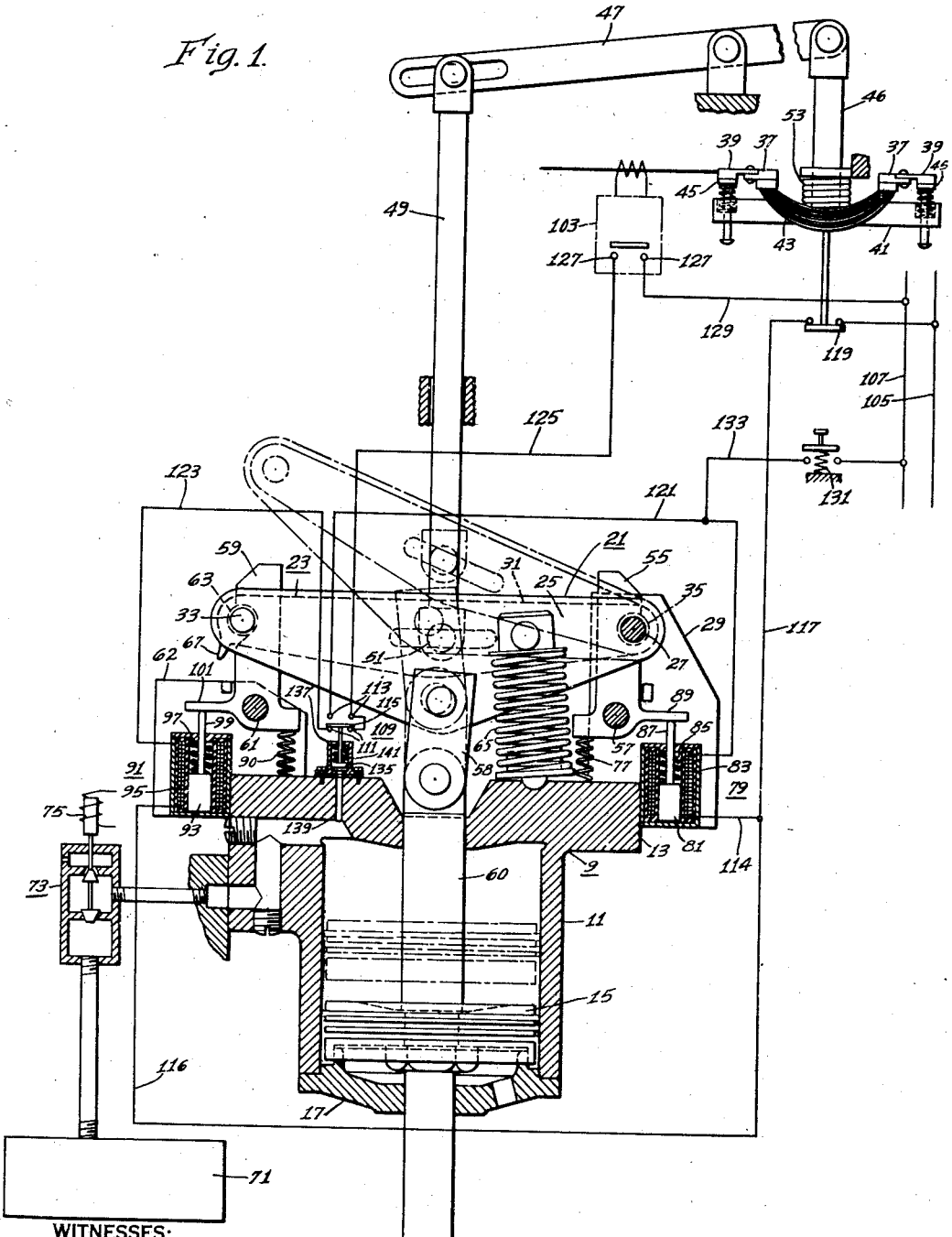

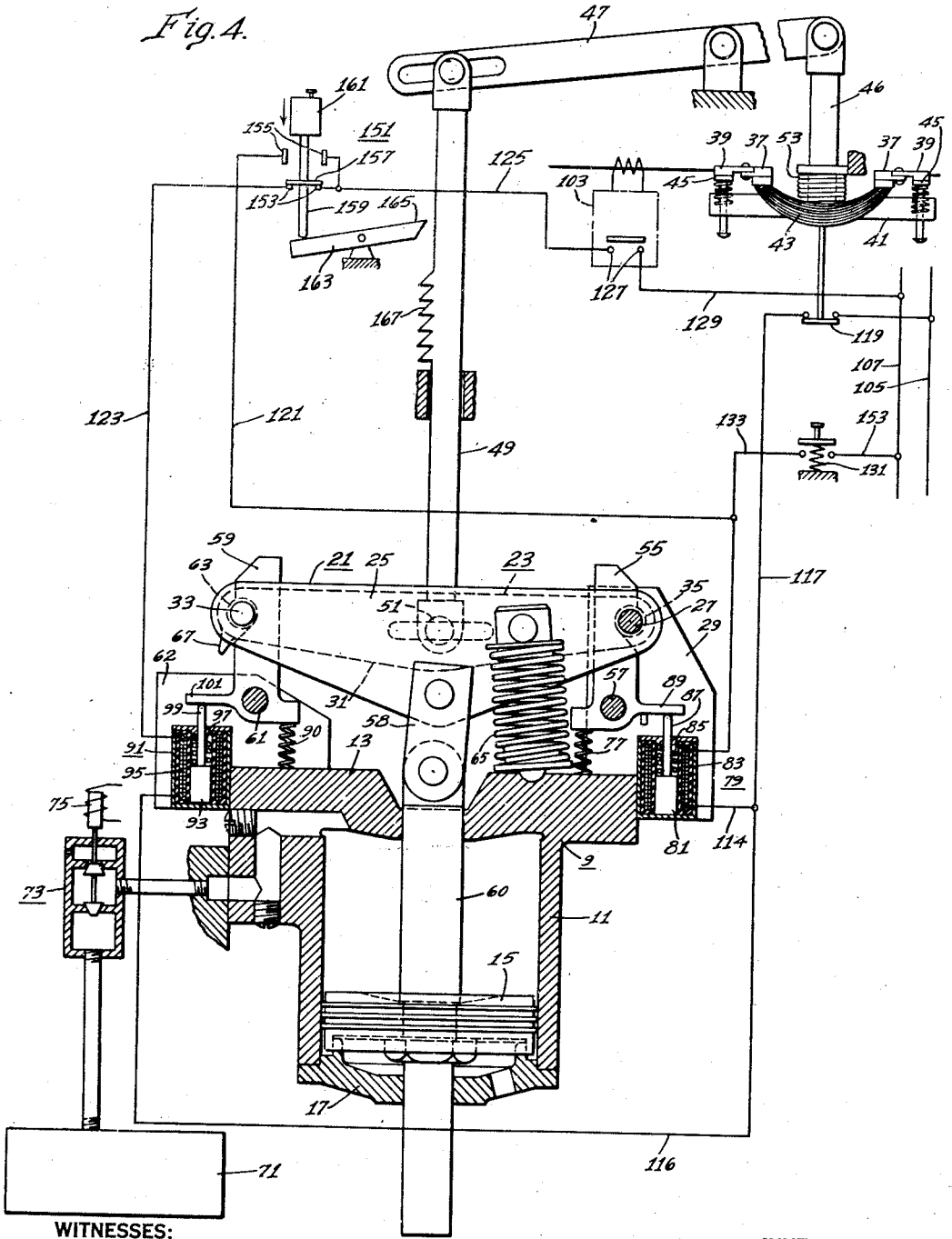

Patented June 17, 1947

2,422,562

UNITED STATES PATENT OFFICE 2,422,562

CIRCUIT BREAKER

Henry L. Peek, Edgewood, Pa., assignor to Westinghouse Electric Corporation, East Pittsburgh, Pa., a corporation of Pennsylvania Application May 15, 1942, Serial No. 443,040

6 Claims. (Cl. 200—82)

The invention relates to circuit breakers and more particularly automatic reclosing circuit breakers of the type which are adapted to be quickly reclosed upon the initial opening thereof by fault conditions in the circuit.

In order to obtain quick reclosing of a circuit breaker, it is desirable to initially trip the breaker in response to a fault condition by a non-trip-free tripping means which leaves the breaker operatively connected to the closing means, or under the immediate control of the closing means, so that reclosing movement can be initiated immediately after the circuit is interrupted and before the breaker reaches the full open position. This is permissible, however, only when the closing means is in deenergized condition and will not retard opening of the breaker. If the fault condition is present when the circuit breaker recloses the circuit it is very important that the breaker be tripped by trip-free tripping means free of the closing means so that opening of the breaker will not be retarded or prevented by the closing means which is usually in energized condition at this time.

The present invention has for an object the provision of an improved circuit breaker operating means wherein tripping of the breaker in response to a fault condition is effected only by a non-trip-free tripping means if the fault condition occurs at any time when the closing means is in deenergized condition, and is effected by a trip-free tripping means if the fault condition occurs at a time when the closing means is in energized condition.

Another object of the invention is the provision of a circuit breaker having a trip-free tripping means, a non-trip-free tripping means, and an improved automatic trip selecting arrangement responsive to the condition of the closing means for selecting which of the tripping means shall be effective to trip the breaker in response to a fault condition.

Another object of the invention is the provision of a circuit breaker having a fluid pressure or gas pressure operated closing means, a trip-free tripping means, a non-trip-free tripping means and an automatic trip selecting device responsive to the condition of the closing means for causing tripping of the breaker in response to a fault condition to be effected only by the non-trip-free tripping means if the fault condition occurs at any time when fluid or gas pressure in said closing means is below a predetermined value, and by said trip-free tripping means if the fault condition occurs when fluid pressure in said closing means is above said predetermined value.

Another object of the invention is the provision of a circuit breaker having a trip coil operable to cause tripping of the breaker free of the closing means, a second trip coil operable to cause tripping of the breaker while leaving the breaker operatively connected to the closing means, and an automatic selector switch operative in accordance with the condition of the closing means for selecting which of said trip coils shall be operated in response to a fault condition in the circuit.

Another object of the invention is the provision of a circuit breaker having a fluid pressure operated closing means, a trip-free trip coil, a non-trip-free trip coil, and a fluid pressure operated selector switch effective when the fluid pressure in said closing means is below a predetermined value to connect only the non-trip-free trip coil to a fault responsive energizing circuit and operative by fluid pressure when fluid pressure in said closing means is above said predetermined value to connect said trip-free trip coil to the fault responsive energizing circuit.

Another object of the invention in accordance with a modification thereof is the provision of a circuit breaker having a trip-free and non-trip free tripping means and an automatic trip selecting switch effective when the closing means is in deenergized condition to connect only the trip coil of the non-trip-free tripping means to the fault responsive energizing circuit, said selector switch being operated by closing movement of the breaker to connect the trip coil of the trip-free tripping means to the fault responsive energizing circuit.

Another object of the invention is the provision of an improved circuit breaker operating mechanism operable to quickly open the breaker at all times and that is capable of quickly reclosing the breaker upon the initial opening thereof by a fault condition.

The novel features that are considered characteristic of the invention are set forth in particular in the appended claims. The structure and operation of the invention together with additional objects and advantages thereof will be best understood from the following detailed description of several embodiments thereof when read in conjunction with the accompanying drawings, in which:

Figure 1 is a schematic view, partly in section, of a circuit breaker embodying the features of the present invention;

Fig. 2 is a plan view of the operating mechanism shown in Fig. 1;

Fig. 3 is a view of the operating mechanism shown in Fig. 1 with the parts shown in the tripped open position immediately following a tripping operation by the trip-free tripping means; and Fig. 4 is a schematic view, partly in section, of a circuit breaker embodying a modification of the invention.

In order to simplify the drawings, some of the parts of the operating mechanism have been shown schematically.

Referring to Figures 1 and 2 of the drawing, the reference numeral 9 indicates generally a metal casting which is formed to provide an operating cylinder 11 and a plate 13 which closes the upper end of the operating cylinder and forms a support for the various parts of the mechanism. An operating piston 15 adapted to be operated by fluid pressure, such as compressed air, is reciprocally movable in the cylinder 11 and this piston together with the cylinder constitutes a fluid motor or closing means for closing the circuit breaker. The lower end of the operating cylinder 11 is closed by a closure 17 secured in any suitable manner to the cylinder.

Mounted on the plate 13 is a lever mechanism of the trip-free type comprising a closing lever 21 pivoted on a fixed pivot at its right-hand end, and a breaker lever 23 pivoted at its left-hand end to the free end of the closing lever 21. The closing lever consists of a pair of spaced parallel levers 25 (Fig. 2) which have their right-hand ends pivoted on a pair of aligned pivot studs 27 carried by spaced vertical plates 29 secured to the plate 13. The breaker lever 23 also consists of a pair of spaced parallel levers 31 (Fig. 2) pivoted at their left-hand ends on a pivot pin 33 carried by and connecting the free ends of the levers 25. The breaker lever 23 is movable into the space between the outer levers 25 which form the closing lever 21, and the right-hand end of the breaker lever carries a trip-free roller 35 which is mounted on a pin carried by and connecting the free ends of the inner levers 31 which form the breaker lever.

The circuit breaker may be of any suitable construction either of the liquid or air break type and is shown schematically in Fig. 1 as comprising stationary main and arcing contacts 37 and 39 and a movable bridging contact assemblage 41 which consists of a main bridge contact 43 and a pair of spring biased arcing contacts 45. The arcing contacts are arranged to engage prior to the main contacts during closing of the circuit breaker and to separate after separation of the main contacts during opening of the breaker. The movable contact assemblage is carried by a rod 46 which is connected to the mid-portion of the breaker lever 23 through the agency of a pivoted lever 47 and an operating rod 49, the lower end of the operating rod 49 being pivotally connected to the breaker lever by a pivot pin 51 which extends between the inner levers 31 which comprise the breaker lever 23. The circuit breaker is biased to open position by an opening or accelerating spring 53. It will be understood that the circuit breaker may be of any conventional type and have any suitable form of contact means.

The breaker lever 23 is biased upwardly by the opening bias of the circuit breaker and the trip-free roller 35 carried by the free end of the breaker lever 23 is normally engaged and releasably held in a position of alignment with the fixed pivot axis 27 of the closing lever 21 by a trip-free latching means comprising a latch 55 pivoted on a pivot pin 57 supported by the plates 29. When the trip-free roller 35 is held in latched position by the latch 55, the breaker lever 23 is operatively connected to the closing lever 21 for movement thereby. The closing lever 21 is connected to the operating piston 15 of the closing means by a pair of connecting links 58 and by a connecting rod 60 which extends into the cylinder through a fluid tight opening in the head of the cylinder.

The free end of the closing lever 21 is adapted to be releasably held in closed position, as shown by the full lines in Fig. 1, by a non-trip-free latch means comprising a latch 59 pivoted on a fixed pivot pin 61 supported by a pair of spaced plates 62. The latch 59 is adapted to engage a roller 63 on the pin 33 at the free end of the closing lever. The closing lever 21 is biased in a clockwise direction about its fixed pivot axis 27 by means of a pair of helical retrieving springs 65 which are disposed between each of the outer levers 25 and the support portion 13.

When the trip-free roller 35 on the free end of the breaker lever 23 is released by a releasing operation of the latch 55, the operative connection between the circuit breaker and the piston 15 of the closing means is released and the breaker is moved to open circuit position at a high speed by the accelerating spring 53, free of any restraint by the closing means. The opening movement of the circuit breaker causes the breaker lever 23 to rotate in a counterclockwise direction toward the open position as shown in Fig. 3, about the pivot pin 33 which is held down by the non-trip-free latch 59. The breaker lever 23 during a portion of its opening movement effects an automatic releasing operation of the non-trip-free latch 59 to thereby release the free end of the closing lever 21 to permit retrieving of the mechanism. For this purpose, the breaker lever 23 has a projection 67 adjacent its pivoted end which during a portion of the opening movement of the breaker lever 23 engages and rotates the non-trip-free latch 59 to released position thereby releasing the free end of the closing lever 21. When the free end of the closing lever 21 is thus released, the retrieving springs 65 rotate the closing lever in a clockwise direction about its fixed pivot axis 27 and this movement of the lever 21 effects a clockwise rotation of the breaker lever 23 about the pivot pin 51 as a center to thereby return the trip-free roller 35 into latching engagement with the latch 55. At this point, the breaker is in full open position and the two levers 21 and 23 are latched together so that the breaker lever is thus again operatively connected to the closing lever 21 and through the same to the operating piston 15 of the closing means.

When the closing means is energized, that is, when compressed air is admitted to the upper end of the operating cylinder 11, the operating piston 15 is moved downwardly and rotates the two levers 21 and 23 together in a counterclockwise direction about the fixed pivot axis 27 to the closed position shown by the full lines in Fig. 1, thereby effecting closing of the circuit breaker. When the two levers reach closed position, the roller 63 is reengaged and latched by the non-trip-free latch 59.

The circuit breaker may also be tripped open by a releasing operation of the non-trip-free latch 59. This allows the circuit breaker to be moved to open position by its accelerating spring thereby causing the two levers 21 and 23 to rotate in a clockwise direction about the fixed pivot axis 27 to the open position. In this instance, however, the circuit breaker remains operatively connected to the closing lever 21 and through the same to the operating piston 15 of the closing means so that the circuit breaker can be reclosed instantly, preferably from some intermediate open position after the arc is extinguished and before the contacts reach full open position. This quick reclosing operation is initiated by admitting compressed air to the upper end of the cylinder 11 at an intermediate point in the opening movement of the breaker so as to initiate the reclosing movement before the breaker reaches full open position. The two levers 21 and 23 are shown in a partly open position by the dot-dash lines in Fig. 1 after having been tripped by the latch 59.

Compressed air for moving the operating piston 15 downwardly to close or reclose the circuit breaker is supplied from an auxiliary air reservoir tank 71. The auxiliary tank 71 is connected to a main air storage tank (not shown) in which compressed air is stored and maintained by a suitable motor driven compressor unit (not shown). The supply of compressed air to the upper end of the operating cylinder 11 is controlled by an inlet valve mechanism shown schematically at 73. The valve mechanism 73 is biased to a closed position in which the valve shuts off the supply of compressed air and at the same time connects the upper end of the operating cylinder 11 to atmosphere through an atmosphere exhaust port. The inlet valve is adapted to be operated to open position to admit compressed air to the upper end of the cylinder 11 upon energization of the electromagnet 75 which controls the valve. The valve mechanism may be of any suitable construction but is preferably similar in construction to the inlet valve mechanism disclosed in the copending application of J. M. Cumming and R. C. Cunningham Serial No. 410,686, filed September 13, 1941, now Patent #2,408,199, issued September 24, 1946, and assigned to the assignee of the present invention.

The trip-free latch 55 is biased to latch position by a spring 77 and is adapted to be operated to released position to release the breaker lever 23 upon energization of a trip coil or tripping solenoid 79 which is mounted on the support 13 beneath the latch 55. The tripping solenoid 79 comprises a movable core 81 and an energizing winding 83 for moving the core upwardly when the winding is energized. The movable core 81 is biased downwardly to its lowermost position by a relatively light biasing spring 85 and the core carries a plunger 87 which is adapted to engage and move a projection 89 of the latch 55 to effect release movement of the latch upon energization of the tripping solenoid 79. The non-trip-free latch 59 is biased to latching position by a spring 90 and is adapted to be operated to released position to release the closing lever 21 upon energization of a tripping solenoid 91 which is mounted at the left-hand end of the supporting plate 13 beneath the non-trip-free latch 59. The tripping solenoid 91 is similar in construction to the tripping solenoid 79 and comprises a movable core 93 and an energizing winding 95 for moving the core upwardly when the winding is energized. The core 93 is biased downwardly by a relatively light spring 97 and the core has a plunger 99 which is adapted to engage and move a projection 101 of the latch 59 to move the latch to released position upon energization of the tripping solenoid. Suitable stops are provided to prevent movement of the latches 55 and 59 beyond their latching positions. Although each of the latching means 55 and 59 has been shown as a single latch, it is to be understood that each of the latching means in actual practice may be constructed in the form of a double latch comprising a main latch and an auxiliary holding latch similar to the latching means disclosed in the aforementioned copending application of J. M. Cumming and R. C. Cunningham, Serial No. 410,686.

The circuit breaker is adapted to be automatically tripped open upon the occurrence of predetermined abnormal conditions in the circuit controlled by the breaker, for example, in response to fault conditions such as overloads or short circuits. Automatic tripping of the breaker in response to these predetermined fault conditions is initiated by the operation of a fault responsive relay indicated generally at 103 which, when operated, completes an energizing circuit for the tripping means of the mechanism. Electrical energy for energizing the tripping solenoids is derived from auxiliary supply lines 105 and 107.

If an overload or fault condition occurs in the circuit controlled by the breaker when the breaker has been standing closed and the closing means is in deenergized condition, that is, when there is no compressed air in the operating cylinder 11, it is desirable that the circuit breaker be tripped only by the non-trip-free tripping means or non-trip-free latch 59 because when the breaker is tripped by this latch, it is moved to open circuit position without releasing the operative connection between the breaker and the closing means. This permits the circuit breaker to be reclosed in the shortest possible time. The closing means is preferably energized at a predetermined intermediate point in the opening movement of the breaker, that is, compressed air is admitted to the cylinder 11 at a predetermined intermediate point in the opening movement of the breaker so as to initiate the reclosing movement before the breaker reaches full open position, preferably to initiate the reclosing movement at a time shortly after the current arcs drawn by the contacts have been completely extinguished. These quick reclosing operations may be accomplished by energizing the inlet valve controlling electromagnet 75 by a control circuit similar to that disclosed in the aforementioned copending application of J. M. Cumming and R. C. Cunningham Serial No. 410,686. However, if the overload or fault condition occurs at a time when the closing means is in energized condition, that is, when there is compressed air in the cylinder 11 above the operating piston 15, it is very important that the breaker be tripped open by means of the trip-free tripping means, that is, by the latch 55, in order to permit high speed opening of the breaker unretarded by any opposing force of the closing means.

In accordance with the invention, an automatic trip selecting arrangement is provided which causes the tripping operation of the breaker in response to predetermined fault conditions to be effected only by the non-trip-free tripping means if the fault or overload condition occurs at any time when the closing means is in deenergized condition, and is operative to cause tripping of the breaker by the trip-free tripping means if the fault or overload condition occurs when the closing means is energized, that is, when there is any compressed air in the cylinder 11 above the operating piston 15. The trip selecting means comprises an automatic trip selecting switch 109 which is operative in accordance with the condition of the closing means to automatically select which of the two tripping solenoids 79 and 91 will be energized in response to a fault condition.

The automatic trip selecting switch 109 comprises a pair of back contacts 111 and a pair of front contacts 113 adapted to be selectively bridged by a movable bridging contact 115. Referring now to the circuit connections of the tripping circuit, the lower terminals of the tripping solenoids 79 and 91 are connected, respectively, by conductors 114 and 116 and by a common lead or conductor 117 to the auxiliary supply line 105. An auxiliary switch 119 operated by the circuit breaker is connected in series in the common lead or conductor 117, and this auxiliary switch is closed when the breaker is in closed position and is open when the breaker is open. The upper terminal of the trip-free tripping solenoid 79 is connected by a conductor 121 to the left-hand front contact 113 of the selector switch 109. The upper terminal of the non-trip-free tripping solenoid 91 is connected by a conductor 123 to the left-hand back contact 111 of the selector switch. The right-hand front and back contacts 111 and 113 of the selector switch are connected together and by a common lead or conductor 125 to one of the contacts 127 of the fault responsive relay 103. The other contact of the fault responsive relay is connected by a conductor 129 to the supply conductor 107. A manually operable push-button switch 131 is provided for manually tripping the circuit breaker and this switch is connected in series in a conductor 133 for connecting the upper terminal of the tripping solenoid 79 to the supply conductor 107. Closing of the manual push-button switch 131 serves to energize only the tripping solenoid 79 so that the breaker is always tripped free of the closing means when tripping is initiated by the manual push-button switch 131.

The automatic trip selecting switch 109 in the embodiment of the invention shown in Fig. 1 of the drawings is controlled by a small air pressure operated piston 135 responsive to the air pressure conditions in the main circuit breaker operating cylinder 11. The piston 135 is connected to the movable bridging contact 115 of the selector switch and is reciprocably movable in a cylinder 137 secured to the top of the supporting plate 13 over the operating cylinder 11. The lower end of the small cylinder 137 communicates with the interior of the upper end of the cylinder by means of an air passage 139 formed in the portion 13 of the cylinder casting 9. A helical spring 141 disposed in the cylinder 137 between the piston 135 and the head of the cylinder 137 biases the piston 135 to its lowermost position to bias the movable bridging contact 115 of the selector switch into engagement with the back contacts 111. The selector switch occupies this position at all times when there is no compressed air in the main circuit breaker operating cylinder 11, that is to say, when the closing means of the breaker is in deenergized condition.

In this normal position of the trip selecting switch 109, it connects the non-trip-free tripping solenoid 91 to the energizing conductor 125 through the back contacts 111 of the selector switch and at the same time disconnects the trip-free tripping solenoid 79 from the energizing conductor 125 since the front contacts 113 of the trip selecting switch are in open position. If an overload or fault condition occurs in the main circuit when the trip selecting switch is in this normal position, the operation of the fault responsive relay 103 will cause energization of only the non-trip-free tripping solenoid 91 so that the circuit breaker will be tripped only by operation of the non-trip-free latch 59 leaving the breaker operatively connected to the closing means. The breaker can, therefore, be quickly reclosed by initiating the reclosing movement thereof before the circuit breaker reaches full open position.

When compressed air is admitted to the upper end of the breaker operating cylinder 11 for closing or reclosing the circuit breaker, compressed air is simultaneously admitted to the lower end of the trip selecting switch operating cylinder 137 through the passage 139 thereby causing the selector switch operating piston 135 to be moved upwardly to close the front contacts 113 of the selector switch and open the back contacts 111. The trip selecting switch 109 remains in this operated position as long as there is any substantial amount of compressed air in the circuit breaker closing means. In this operated position of the trip selecting switch 109, it serves to connect the trip-free tripping solenoid 79 to the energizing conductor 125 through the front contacts 113 of the trip selecting switch and at the same time maintains the circuit of the non-trip-free tripping solenoid 91 open at the back contacts 111 of the trip selecting switch. Consequently, if an overload or fault condition occurs in the main circuit when the trip selecting switch 109 is in its upper operating position, the operation of the fault responsive relay 103 will cause energization of the trip-free tripping solenoid 79 so that the circuit breaker will be tripped free of the operating piston 15 of the closing means and will be moved quickly to the open position irrespective of the energized condition of the closing means.

The operation of the circuit breaker is briefly as follows: Assuming the circuit breaker to be in the closed and latched position, as shown in Fig. 1, and the closing means in deenergized condition with no compressed air in the operating cylinder 11 above the piston 15, the automatic trip selecting switch 109 will be in the normal position, as shown in Fig. 1, with the movable contact 115 thereof bridging the back contacts 111. If an overload or fault condition occurs at any time when the mechanism is in this deenergized condition, the fault responsive relay 103 will close its contacts 127 and complete an energizing circuit for the non-trip-free tripping solenoid 91. This energizing circuit extends from the supply line 107 through conductor 129, contacts 127 of the fault relay, conductor 125, back contacts 111 of the trip selecting switch 109, conductor 123, winding 95 of the tripping solenoid 91, and conductors 116 and 117 to the supply line 105. Energization of the tripping solenoid 91 moves the plunger 99 upwardly to actuate the non-trip-free latch 59 to released position, thereby releasing the connected left-hand ends of the closing lever 21 and breaker lever 23. The circuit breaker is moved quickly toward open position by the accelerating spring 53 rotating the connected levers 21 and 23 in a clockwise direction about the fixed pivot axis 27. Quick automatic reclosing operation of the circuit breaker is initiated before the breaker reaches full open position by admitting compressed air to the operating cylinder 11 at an intermediate point in the opening movement of the breaker piston 15. The compressed air quickly reverses the movement of the operating piston 15 and starts the reclosing movement of the breaker from some intermediate position by rotating the now connected levers 21 and 23 in a counterclockwise direction about the fixed pivot axis 27. If the overload or fault condition has been cleared by the interruption of the circuit, the closing means returns the circuit breaker to the fully closed position and the roller 63 on the left-hand ends of the levers is returned to the fully latched position where it is reengaged by the latch 59. At the same time that compressed air is admitted to the circuit breaker operating cylinder 11 to initiate the reclosing movement, compressed air is also admitted to the lower end of the trip selecting switch operating cylinder 137 and moves the piston 135 upwardly to open the back contacts 111 of the selector switch and close the front contacts 113 thereby connecting the trip-free tripping solenoid 79 to the energizing conductor 125. The trip selecting switch 109 remains in this operating position as long as there is any compressed air in the upper end of the operating cylinder 11. If the overload or fault condition is still present at the time the arcing contacts of the circuit breaker reclose the main circuit, the fault responsive relay 103 will again be operated to close its contacts 127. Since at this time the trip selecting switch is in its upper operating position, the trip-free tripping solenoid 79 will be immediately energized over a circuit extending from the supply conductor 107 through conductor 129, contacts 127 of the fault relay 103, conductor 125, front contacts 113 of the trip selecting switch 109, conductor 121, winding 83 of the trip-free tripping solenoid 79 and conductors 114 and 117 to the supply conductor 105. The energization of the tripping solenoid 79 causes the trip plunger 87 to move the trip-free latch 55 to released position thereby releasing the trip-free roller 35 carried by the free end of the breaker lever 23. The circuit breaker will, therefore, be quickly moved to open position by its accelerating spring, free of the operating piston 15, that is, irrespective of the energized condition of the closing means which is still energized at this time. The operating piston 15 continues on to the lowermost closed position at which time the supply of compressed air is shut off by the inlet valve 73 and the compressed air above the operating piston 15 is exhausted to atmosphere through the exhaust port of the inlet valve 73.

As soon as the compressed air is exhausted from the cylinder 11, the trip selecting switch 109 is returned to its lowermost or normal position by its biasing spring 141. This position of the parts is ilustrated in Fig. 3 of the drawings. When the breaker lever 23 is in open position as illustrated, the projection 67 thereof has operated the non-trip-free latch 59 to released position and the free end of the closing latch 21 is released thereby. The retrieving springs 65 thereupon move the closing lever 21 in a clockwise direction about the fixed pivot axis 27. This movement of the closing lever returns or retrieves the breaker lever 23 in a clockwise direction about the pivot pin 51, returning the trip-free roller into latching engagement with the trip-free latch 55. The two levers 21 and 23 are now again operativey connected together and are in the full open position so that the mechanism is operative to close the breaker when the closing means is energized.

A modification of the invention is illustrated in Fig. 4 of the drawings. In accordance with this modification of the invention, an automatic trip selecting switch, indicated generally at 151, is provided for automatically selecting which of the two tripping means shall be effective to trip the breaker. The automatic trip selecting switch 151 comprises a pair of back contacts 153 and a pair of elongated front contacts 155 of the slide type, and a movable bridging contact 157 for selectively bridging the front or back contacts of the switch. The movable bridging contact 157 is carried by a rod 159 which is biased downwardly by gravity or a light biasing spring (not shown) so as to normally maintain the bridging contact 157 in engagement with the back contacts 153. The right-hand front and back contacts are connected to the energizing conductor 125 and the other back contact 153 is connected to the conductor 123 leading to the upper terminal of the non-trip-free tripping solenoid 91. The left-hand front contact 155 is connected to the conductor 121 leading to the upper terminal of the trip-free tripping solenoid 79. The automatic tripping selecting switch 151 is adapted to be operated mechanically to its upper position to open the back contacts 153 and close the front contacts 155, by the closing movement of the circuit breaker and is maintained in its upper operated position for a predetermined time interval by a dashpot device 161. In order to actuate the selector switch 151 by the closing movement of the circuit breaker, there is provided an actuating lever 163 which is pivoted intermediate its ends on a fixed support. The left-hand end of the actuating lever is disposed beneath the lower end of the rod 159 of the selector switch and engages the rod. The right-hand end of the actuating lever 163 is formed to provide a pawl 165 which cooperates with ratchet teeth 167 provided on the breaker operated rod 49 or some part movable with the breaker. The remaining structure of the circuit breaker and operating means is identical to that of the original embodiment and the corresponding parts have been indicated by the same reference characters.

When the circuit breaker has been standing in the closed position and the closing means is de-energized, that is, when there is no compressed air in the circuit breaker operating cylinder 11, the trip selecting switch 151 is maintained in the normal position shown in Fig. 4, in which it connects the non-trip-free tripping solenoid 91 to the energizing conductor 125 through the back contacts 153 of the selector switch. If an overload or fault condition occurs at this time, the operation of the fault responsive relay 103 will cause energization of the non-trip-free solenoid 91 only, thereby tripping the breaker by means of the non-trip-free latch 59 which leaves the breaker operatively connected to the closing piston 15. This permits the circuit breaker to be quickly reclosed by initiating the reclosing movement thereof before the breaker reaches full open position. Closing or reclosing movement of the breaker, however, causes the ratchet teeth 167 to rotate the actuating lever 163 in a clockwise direction thereby moving the trip selecting switch 151 to its upper operating position, in which it opens the back contacts 153 and closes the front contacts 155. The trip selecting switch 151 is maintained in this upper operating position for a predetermined time interval after the operation thereof, the time interval being of sufficient length to maintain the switch in its upper operated position until after the breaker operating piston 15 has completed its closing movement and the compressed air has been exhausted from the upper end of the operating cylinder. In this upper actuating position, the trip selector switch 151 connects the trip-free tripping solenoid 79 to the energizing conductor 125 through the front contacts 155 of the selector switch so that if an overload or fault condition occurs at this time, the operation of the fault relay 103 will complete the energizing circuit for the trip-free tripping solenoid 79 and thereby cause the breaker to be tripped free of the closing means by the trip-free latch 55. Thus if the overload or fault condition is still present at the time the circuit breaker recloses the circuit, the breaker will be immediately tripped free of the closing means in the same manner as in the original embodiment. The breaker will also be tripped free of the closing means on a normal closing operation if an overload or fault condition exists at this time.

It will thus be seen that in both embodiments of the invention, the trip selecting arrangement makes the circuit breaker mechanism non-trip-free at any time when the closing means is in deenergized condition, and trip-free whenever the closing means is in energized condition.

While the invention has been disclosed in accordance with the provisions of the patent statutes, it is to be understood that various changes in the structural details and arrangement of parts thereof may be made without departing from some of the essential features of the invention. It is desired, therefore, that the language of the appended claims be given the broadest reasonable interpretation permissible in the light of the prior art.

I claim as my invention:

1. In combination, a circuit breaker, closing means for closing said breaker, trip-free tripping means for effecting opening of said breaker irrespective of the energized condition of said closing means, non-trip-free tripping means for effecting opening of said breaker only when said closing means is deenergized, means for operating said tripping means, and a device effective whenever the breaker is in closed position to prevent operation of said trip-free tripping means, said device being mechanically operated by the breaker upon closing movement of said breaker to permit operation of said trip-free tripping means.

2. In combination, a circuit breaker, closing means for closing said breaker, trip-free tripping means for effecting opening of said breaker irrespective of the energized condition of said closing means, non-trip-free tripping means for effecting opening of said breaker only when said closing means is deenergized, means for operating said tripping means, device biased to a normal position in which it causes only said non-trip-free tripping means to be effective, said device being movable to a second position in which it causes said trip-free tripping means to be effective, said device remaining in said normal position when the breaker is in closed position, mechanical means operated by the breaker during a closing movement thereof to operate said device to said second position, and time delay means for maintaining said device in said second effective position for a predetermined time interval after it is moved to said second position.

3. In combination, a circuit breaker, closing means for closing the breaker, trip-free tripping means having a trip coil operable when energized to cause opening of the breaker free of said closing means, non-trip-free tripping means having a trip coil operable when energized to cause opening of the breaker, means for energizing said trip coils, a selector switch effective when said breaker is standing in the closed position to prevent energization of said trip-free trip coil, and a mechanical device operated by said breaker during closing movement of said breaker to operate said selector switch to permit energization of said trip-free trip coil.

4. In combination, a circuit breaker, closing means for closing said breaker, trip-free tripping means having a trip coil operable when energized to cause tripping of the breaker free of the closing means, non-trip-free tripping means having a trip coil operable when energized to cause tripping of the breaker with the breaker remaining operatively connected to the closing means, means for energizing said trip coils, and an automatic selector switch normally effective to connect only said non-trip-free trip coil for energization by said energizing means whenever said breaker is in closed position, said selector switch being operated mechanically by closing movement of said breaker to connect said trip-free trip coil for energization by said energizing means.

5. In combination, a circuit breaker, a fluid motor operable to close the breaker, a trip-free lever connected to said breaker, trip-free tripping means normally restraining one end of said trip-free lever, said trip-free tripping means including a trip coil operable when energized to release said one end of said trip-free lever and effect opening of the breaker free of said closing motor, a non-trip-free lever connected to said closing motor, non-trip-free tripping means normally restraining the other end of said trip-free lever and one end of said non-trip-free lever, said non-trip-free tripping means including a trip coil operable when energized to release said levers and effect opening of the breaker with the breaker remaining operatively connected to the closing motor, means for energizing said trip coils, said trip-free lever when released effecting release of the non-trip-free lever to permit retrieving of said trip-free lever, and means for selectively determining which one of said trip coils is to be energized.

6. In combination, a circuit breaker, a fluid pressure operated motor for closing said breaker, means comprising a trip-free lever and a non-trip-free lever normally connecting said motor to said breaker, trip-free tripping means including a trip coil operable when energized to permit movement of said trip-free lever independently of said non-trip-free lever and opening of said breaker free of said closing motor, non-trip-free tripping means including a trip coil operable when energized to permit movement of both of said levers and opening of the breaker with the breaker remaining operatively connected to the closing motor, means for energizing said trip coils, and a selector switch responsive to the position of the breaker when said breaker is in closed position to connect said non-trip-free trip coil only for energization by said energizing means, and means comprising a lever operated by closing movement of the breaker for operating said selector switch to connect said trip-free coil for energization by said energizing means.

HENRY L. PEEK.

REFERENCES CITED

The following references are of record in the file of this patent:

UNITED STATES PATENTS

| Number | Name | Date |
| --- | --- | --- |
| 2,270,353 | Spurck | Jan. 20, 1942 |
| 2,150,584 | MacNeill | Mar. 14, 1939 |
| 2,150,587 | Peterson | Mar. 14, 1939 |
| 2,242,916 | MacDonald | May 20, 1941 |
| 2,292,096 | Thumin et al. | Aug. 4, 1942 |
| 2,319,645 | Thumin | May 18, 1943 |
| 2,261,929 | Rippl | Nov. 4, 1941 |